United States Patent [19]

Förster et al.

[11] 4,440,113
[45] Apr. 3, 1984

[54] CONNECTING SYSTEM FOR CERAMIC COMPONENTS OF A BURNER AND/OR HEATING DEVICE

[75] Inventors: Siegfried Förster, Alsdorf; Stefan R. Schindler; Hans-Jürgen Pohlmann, both of Selb, all of Fed. Rep. of Germany

[73] Assignees: Kernforschungsanlage Jülich GmbH, Jülich; Rosenthal Technik AG, Selb, both of Fed. Rep. of Germany

[21] Appl. No.: 333,259

[22] Filed: Dec. 22, 1981

[30] Foreign Application Priority Data

Dec. 24, 1980 [DE] Fed. Rep. of Germany ....... 3049163

[51] Int. Cl.³ .............................................. F22B 5/00
[52] U.S. Cl. ...................................... 122/16; 122/43; 122/95 TB; 122/209 R; 165/76
[58] Field of Search ................ 122/209 R, 95 TB, 16, 122/43, 179; 126/350 R, 361; 165/76; 431/5, 215

[56] References Cited

U.S. PATENT DOCUMENTS

| 653,246 | 7/1900 | Keith | 122/95 TB |
| 3,556,701 | 1/1971 | Momoda et al. | 431/181 |
| 3,908,603 | 9/1975 | Schiffelers | 122/209 R |
| 4,271,789 | 1/1981 | Black | 122/16 |

Primary Examiner—Edward G. Favors
Attorney, Agent, or Firm—Karl F. Ross; Herbert Dubno

[57] ABSTRACT

Ceramic components of a burner-heat exchanger or like types, in which two fluids are passed in indirect heat exchange along opposite sides of ceramic walls through respective passages in a ceramic body defining these walls and passages, are interconnected by extending the outer plates within which the ceramic body is enclosed at each end of each pair of components to be joined so that the extensions can be connected together, e.g. with a sleeve and between the ceramic bodies, chambers can be formed.

5 Claims, 5 Drawing Figures

CONNECTING SYSTEM FOR CERAMIC COMPONENTS OF A BURNER AND/OR HEATING DEVICE

CROSS REFERENCE TO RELATED APPLICATIONS

The present application is related to the commonly assigned copending application Ser. No. 253,258 filed Apr. 13, 1981, U.S. Pat. No. 4,391,227, and referring in turn to application Ser. No. 253,296 filed Apr. 13, 1981, abandoned, which discloses and claims subject matter now found in Ser. No. 254,092 of Apr. 14, 1981. Reference may also be had to commonly assigned copending application Ser. No. 100,634 of Dec. 5, 1979, U.S. Pat. No. 4,364,726 Ser. No. 134,797 of Mar. 28, 1980 U.S. Pat. No. 4,376,627 and Ser. No. 250,768 of Apr. 3, 1981 abandoned.

FIELD OF THE INVENTION

Our present invention relates to the joining of ceramic components of a burner or heating unit or assembly, preferably operating under the principles described in the aforementioned copending applications, so that a fluid can flow from one of the components into another of the components.

More particularly, the invention relates to a burner or heater unit whose components include the burner head and at least one heat exchanger, both the burner head and the heat exchanger having ceramic bodies with slit-like passages separated by ceramic walls and through which respective fluids can pass.

BACKGROUND OF THE INVENTION

We, along with our coworkers, have developed significant improvements in the field of industrial heating, home-heating, water-heating and the like units which are comparatively small and efficient and which have significant advantages over metallic structures, especially where heat exchange is carried out to the point that a heat carrier is reduced in temperature below its dewpoint.

The aforementioned copending applications describe the principles involved in the improved burner and heat exchanger assemblies and these principles may be summarized by stating that the heat exchange between two fluids is effected within the ceramic body which can be formed unitarily with thin slit-like passages for the fluids, that the passages for *one* fluid alternate with passages for the other fluid, and that the ceramic body has walls through which indirect heat exchange between the fluids can be effected.

A suitable heat carrier can be combustion gases which can be used to heat a variety of other fluids, e.g. the combustion air, the fuel or another heat carrier such as water used for central heating or utility water, e.g. to supply the heat and hot-water demands of the residence or other structure.

In turn, any of these fluids can serve as a heat carrier for heating another fluid; for instance the hot combustion gas can be utilized to heat circulating central heating water or fresh water for omestic purposes. In all cases the heat exchange can be effected through walls of any ceramic body so that, for example, if a gas such as the combustion gas contains acidic components, it may nevertheless be cooled below its dew point without engendering corrosion or the like.

The particular class of heating units with which the present invention is most concerned has a burner head supplied with fuel and combustion air and feeding these fluids to a combustion chamber and at least one heat exchanger or recuperator for effecting heat exchange between the combustion gas generated in this chamber and a medium to be heated, both the burner and the heat exchanger having ceramic bodies of the type described, which open toward one another at slit-like passages.

Such burner assemblies can be utilized for large scale generating of heat, e.g. as industrial furnaces or for industrial furnaces as well as for small heat-generating plants, e.g. for space heating in a home or space heating of a room in a home, or for the generation of utility water in the manner described.

The burner head and the recuperator are thus provided in series as described, for example, in the publication entitled *Ceramic Components for Thermodynamics and Process Engineering* by KFA, Kernforschungsanlage Jülich GmbH, Jülich, Germany, 1980, and in the aforementioned copending application Ser. No. 253,258. These components are rectangular in cross section and have identical cross sections.

OBJECTS OF THE INVENTION

The principal object of the present invention is to provide an improved heating unit of the type described whereby connection of the components is facilitated without interference with flow of the media.

Another object of the invention is to provide a heating unit of the type described which is of an especially low cost and which also is simple to fabricate, maintain and operate.

Still another object of this invention is to advance the principles set forth in the aforedescribed applications.

SUMMARY OF THE INVENTION

These objects and others which will become apparent hereinafter are attained, in accordance with the present invention, which is based upon our discovery that an extremely simple and convenient connection between components of the type described can be achieved by enclosing the ceramic bodies of the two components, i.e. the bodies formed with the slit-like passages, within lateral walls which preferably are formed by ceramic plates and extending these outer walls of the components toward one another beyond the ceramic passage-forming bodies so that these end walls substantially abut with the extended portions of the walls forming connecting ducts joining the components in an end-to-end relationship.

Thus these walls extend beyond the mouth of the flow passages formed in the ceramic bodies mentioned previously.

The connection between these ducts formed at the mutually adjoining ends of the two or more components can be secured together by releasable sleeves, collars or the like providing especially convenient means for interconnecting the components.

Moreover, the arrangement has the important advantage that the extensions define chambers between the bodies which permit redistribution in a highly uniform manner of gas flow from the passages of one body to the slit-like passages of the other.

Since the components are releasably interconnected by gas-tight removable sleeves which surround the connecting ducts, in the event of failure, a defective component can be removed and replaced.

According to another feature of the invention, the connection between the burner and the recuperative heat exchanger, i.e. the heat exchanger which abstracts heat from the combustion gases and transfers this heat to another medium for reuse, e.g. water, is such that the compartment defined by the interconnected ends of the two components simultaneously forms the combustion chamber downstream of the burner body and upstream of the recuperator body.

This arrangement of the combustion chamber permits the combustion to be carried out at a convenient location and has other advantages as well. For example, it eliminates the need for a separate provision of an element adapted to form the combustion chamber. It permits the heat generated in the combustion chamber to be conductively transferred to the burner head and to the recuperator and assist in the preheating of the fuel and air and water respectively therein.

Costly insulation of the burner chamber can be avoided and heat from the combustion chamber can be conductively transmitted to the burner head and to the recuperator so that the heating of the medium, e.g. combustion air and gas and water, can be effected in part by conductively transmitted heat and in part by the sensible heat carried by the combustion gases. This is especially the case when, in accordance with a preferred embodiment, the components are constituted from a ceramic having high thermal conductivity such as silicon nitride.

BRIEF DESCRIPTION OF THE DRAWING

The above and other objects, features and advantages will become more readily apparent from the following description, reference being made to the accompanying drawing in which.

SPECIFIC DESCRIPTION

Figure 1:
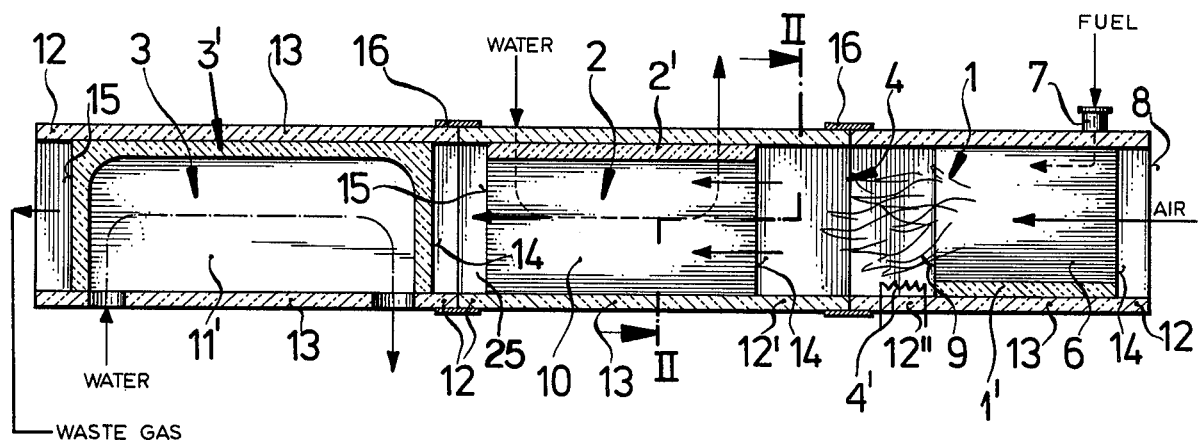
FIG. 1 is a cross sectional view taken along the line I—I of FIG. 2 and constituting a longitudinal section through a burner and heater unit having three components interconnected in accordance with the present invention.

The burner-heater device shown in the drawing comprises a ceramic burner head 1 forming a first component, a ceramic recuperator 2 forming a second component connected to the burner head 1 and a ceramic recuperator 3 forming a third component connected to the recuperator 2, the connections between these components being the principal subject of this invention.

In general, the operation of the burner-recuperator system of FIG. 1 will be apparent from application Ser. No. 253,258, while the construction of the various elements, except for the extensions of the lateral walls forming the connections, can be deduced from the aforementioned copending application.

Between the burner head 1 and the recuperator 2, a combustion chamber 4 is formed which can be provided with an igniter 4′, (see application Ser. No. 253,258), this igniter being shown in a highly diagrammatic form and being electrically energized to ignite an air/fuel mixture entering the combustion chamber from the burner body.

Each of the components includes a square-cross section ceramic body 1′, 2′, 3′ enclosed within lateral walls 13 including, for example, for the burner, the upper and lower walls 13a, 13b and the side walls 13c, 13d, all of which are fused together and to the ceramic body 1′ enclosed by them. These walls are formed as ceramic plates.

Figure 2:
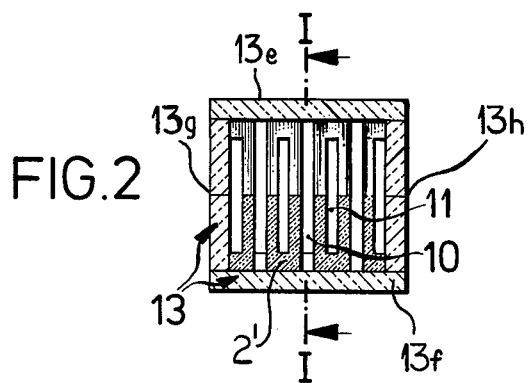
FIG. 2 is a section taken along the line II—II of FIG. 1.

Similarly, the first recuperator 2 has upper walls 13e (FIG. 2), a lower wall 13f and two side walls 13g and 13h, similarly fused together and fused to the ceramic body 2′.

Figure 4:
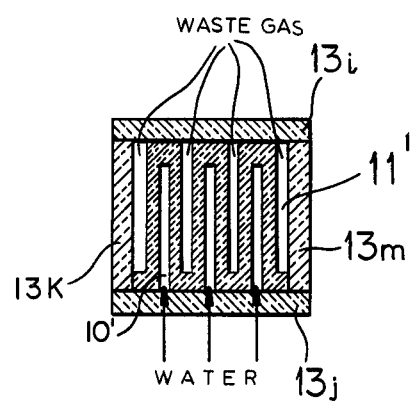
FIGS. 3 and 4 are sections taken through the burner head and a recuperator, respectively.
Figure 3:
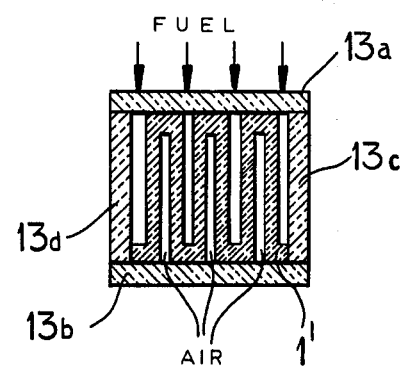

The second recuperator (FIG. 4) similarly has upper and lower walls 13i and 13j and side walls 13k and 13m.

The ceramic bodies 1′, 2′ and 3′ are formed as described in the aforementioned KFA publication, with slender slit-like passages separated by the ceramic partitions of the body and traversed with respective fluids.

In the system shown in the drawing, for example the burner body 1 has alternating flow passages 6 and 5 for the fuel and combustion air, respectively, the fuel and air being delivered by respective connecting fittings 7 and 8. The flow passages 5 and 6 open at an end 9 of the body 1′ into the combustion chamber 4 such that the air and fuel emerge substantially uniformly over the entire area of the end face 9 of the body 1′, intensively mixed together and burned in a short combustion zone.

This combustion generates hot combustion gases which traverse the flow passages 10 in the first recuperator body 2′ to heat a medium such as water traversing passages 11 which alternate with the passages 10 in the manner described.

In the next recuperator, the hot combustion gas traverses the passages 10′ of the body 3′ while the water passes through the passages 11′ and is heated.

The water from one of the recuperators, e.g. the recuperator 3, can be used as utility water while the water from recuperator 2 is used for the space heating purposes. Of course both recuperators can be utilized to supply heat for household heating purposes if desired.

The burner head 1 and the recuperators 2, 3, for connection of these components together in an end-to-end relationship have respective duct-like extensions 12, 12′, 12″ which are formed by prolongations of the outer walls 13 beyond the bodies 1′, 2′, 3′. For example, the bodies 2′ and 3′ have inlet end faces 14 and outlet end faces 15 which are set inwardly of the ends of the respective components by a distance which is at least equal to the thickness of the plates or walls forming the duct extensions and preferably a multiple of this thickness. As a result, chambers 4 and 25 are provided between the bodies of the components.

Chamber 25, for example, serves to ensure a uniform gas distribution as the gas enters the second recuperator from the first.

The components can be disconnected readily from one another by releasing the sleeves 16 which sealingly join the components together and bridge any seam between them. Such release is convenient for replacement of a defective one of the components.

The connecting ducts 12′ and 12″ of the burner head 1 and the recuperator 2, respectively, also define a compartment, namely the compartment 4 constituting the combustion chamber.

Heat from the walls of the combustion chamber is transmitted conductively to both the burner head 1 and the recuperator 2 to preheat the fuel and air in the first case and permit better heating of the water in the second. Because of this heat conduction special insulation of the combustion chamber is not required.

Naturally, instead of recuperators for the heating of water, the recuperators can transfer heat to any fluid, e.g. to the combustion air preheated therein. In fact, a recuperator for the preheating of the air can be provided in addition in the assembly described in a similar manner. Thus an important advantage of the invention is that it allows modular assembly of components for various purposes.

Figure 5:
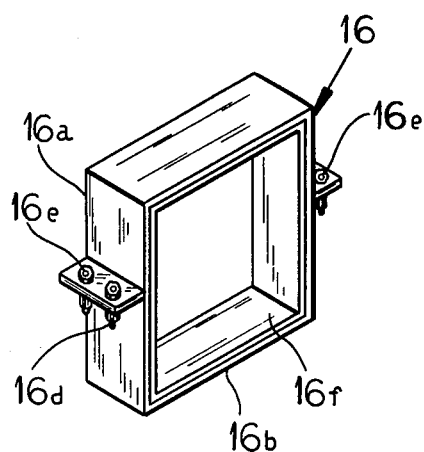
FIG. 5 is a somewhat diagrammatic perspective detail view of a connector for the purposes of the present invention.

The sleeve 16 (FIG. 5) can comprise a pair of C-shaped members 16a, 16b with lateral lugs 16c and 16d which can be bolted together as shown at 16e to form the releasable connection of the sleeve parts which enable the clamping sleeve to be removed from the assembly and the components thereof separated. The interior of the sleeve 16 may be lined with a thermally insulating layer 16f which ensures sealing of the seam at which the components are joined.

We claim:

1. A burner and heating device which comprises:
   a burner component including a first ceramic body formed with passages for a fuel and combustion air whereby said fuel and combustion air is mixed at an end of said body to form a combustible mixture which is burned to form hot combustion gas, and ceramic walls, surrounding said body and forming a duct-like extension of said burner component projecting beyond said end of said body;
   a recuperator component including a second ceramic body formed at the respective passages for said combustion gas and a medium to be heated, and with walls defining a duct-like extension of said recuperator component projecting beyond said second body, said duct-like extensions being aligned; and
   means for securing said duct-like extensions together.

2. The device defined in claim 1 wherein said duct-like extensions together define a combustion chamber wherein said combustion gas is formed.

3. The device defined in claim 2 wherein said walls of said recuperator component extend beyond said second body in a direction away from said burner component in a further duct-like extension, said device further comprising a second recuperator component having a third ceramic body formed with passages for said combustion gas and another medium to be heated, and walls forming another duct-like extension beyond said third body, said other extension and said further extension being aligned and interconnected.

4. The device defined in claim 1, claim 2 or claim 3 wherein the means for interconnecting the extensions is releasable to enable replacement of a defective one of said components.

5. The device defined in claim 4 wherein each of said bodies is formed unitarily with slit-like passages for respective fluid alternating with one another and separated by ceramic partitions unitary with said body.

* * * * *